United States Patent
Konya

(10) Patent No.: US 9,112,540 B2
(45) Date of Patent: Aug. 18, 2015

(54) COMMUNICATION APPARATUS AND COMMUNICATION SYSTEM

(75) Inventor: Satoshi Konya, Kanagawa (JP)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 13/525,652

(22) Filed: Jun. 18, 2012

(65) Prior Publication Data

US 2012/0326520 A1   Dec. 27, 2012

(30) Foreign Application Priority Data

Jun. 27, 2011   (JP) ................................. 2011-141584

(51) Int. Cl.
*H04B 5/00* (2006.01)
*H01Q 1/50* (2006.01)
*H02J 5/00* (2006.01)
*H01Q 7/00* (2006.01)

(52) U.S. Cl.
CPC ............... *H04B 5/0031* (2013.01); *H01Q 7/00* (2013.01); *H02J 5/005* (2013.01); *H04B 5/0037* (2013.01); *H04B 5/0075* (2013.01)

(58) Field of Classification Search
CPC ........... H02J 17/00; H02J 5/005; H02J 7/025; H04B 5/00; H01F 38/14
See application file for complete search history.

(56) References Cited

U.S. PATENT DOCUMENTS

| | | | |
|---|---|---|---|
| 7,750,851 B2 | 7/2010 | Washiro | |
| 8,008,985 B2 | 8/2011 | Washiro | |
| 8,013,795 B2 | 9/2011 | Washiro | |
| 2008/0076351 A1* | 3/2008 | Washiro | ........................ 455/41.1 |
| 2008/0117117 A1* | 5/2008 | Washiro | ........................ 343/850 |
| 2008/0238584 A1* | 10/2008 | Kunze et al. | .................. 333/247 |
| 2009/0015362 A1* | 1/2009 | Okada et al. | ..................... 336/65 |
| 2009/0146796 A1 | 6/2009 | Goto et al. | |
| 2009/0295662 A1* | 12/2009 | Suetsuna et al. | ............... 343/787 |
| 2009/0308653 A1* | 12/2009 | Wu | ................ 174/377 |
| 2010/0156344 A1 | 6/2010 | Inoue et al. | |
| 2010/0257725 A1* | 10/2010 | Akiho | ............................. 29/600 |
| 2011/0025265 A1* | 2/2011 | Mochida et al. | ............... 320/108 |
| 2011/0049249 A1* | 3/2011 | Kato et al. | ..................... 235/492 |
| 2011/0136430 A1* | 6/2011 | Konya | .......................... 455/41.1 |
| 2011/0241804 A1* | 10/2011 | Kato et al. | .................. 333/24 R |
| 2012/0223588 A1* | 9/2012 | Suzuki | .......................... 307/104 |

FOREIGN PATENT DOCUMENTS

| | | |
|---|---|---|
| JP | 2008-154267 A | 7/2008 |
| JP | 2009100111 A | 5/2009 |
| JP | 2010-213197 A | 9/2010 |
| JP | 46-050536 | 12/2010 |
| WO | 2007-080820 A1 | 7/2007 |

OTHER PUBLICATIONS

European Search Report EP 12169109, dated Oct. 17, 2012.
"Transferjet" (trademark) http://www.transferjet.org/ja/index.html (as of Jun. 23, 2011), Las Vegas, Jan. 10-13, Central Hall Booth # 15112, 2 pgs.

* cited by examiner

*Primary Examiner* — Edward Urban
*Assistant Examiner* — Ralph H Justus
(74) *Attorney, Agent, or Firm* — Sony Corporation

(57) ABSTRACT

There is provided a communication apparatus including a magnetic sheet that includes an opening, a non-contract power supply coil that is disposed on the magnetic sheet, a high-frequency coupler that includes a coupling electrode, a ground, and a resonance unit configured to increase an amount of current flowing into the coupling electrode, and is configured such that the coupling electrode appears on the magnetic sheet via the opening, and a communication circuit unit that processes a high-frequency signal transmitted to and received from the coupling electrode.

9 Claims, 14 Drawing Sheets

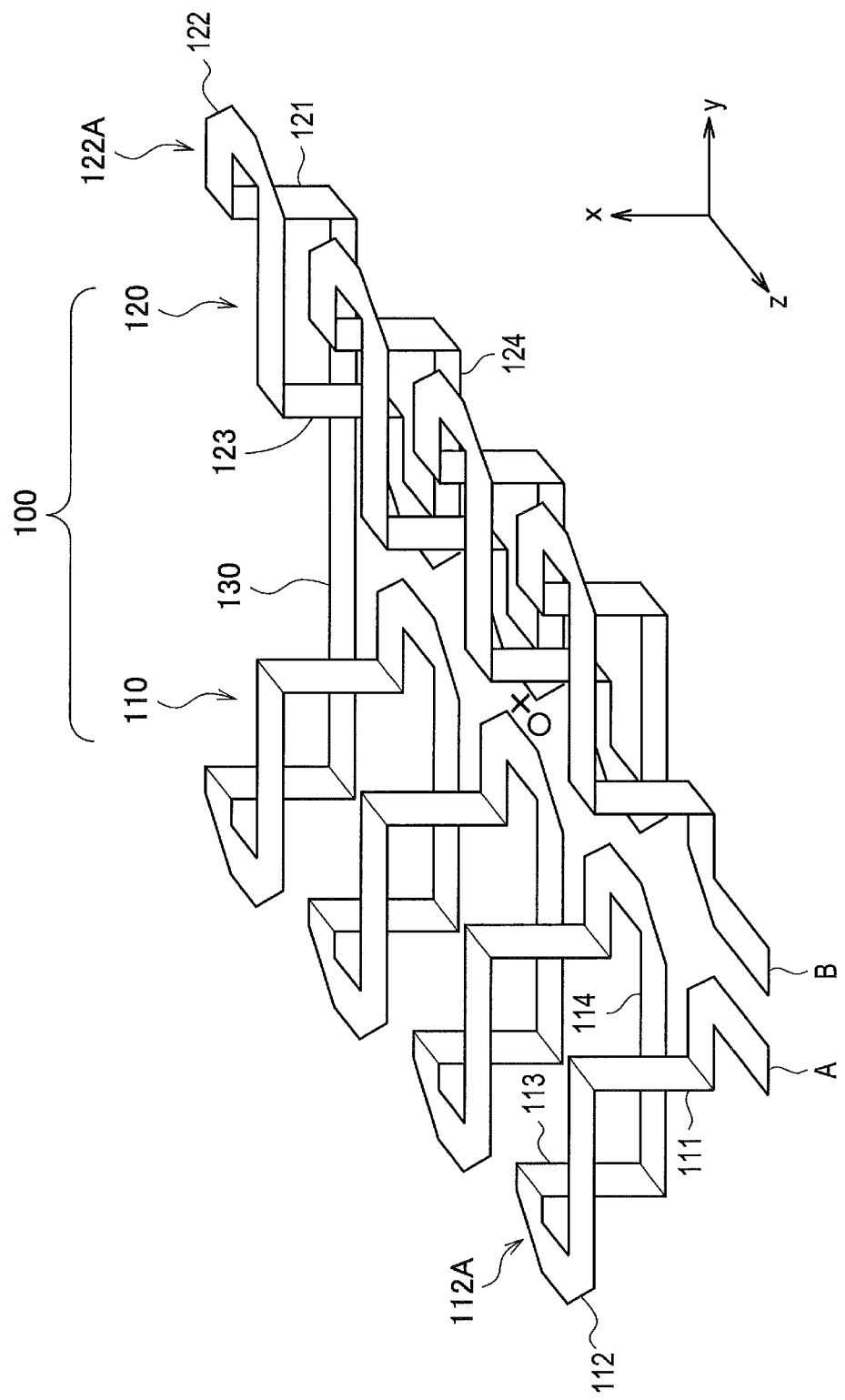

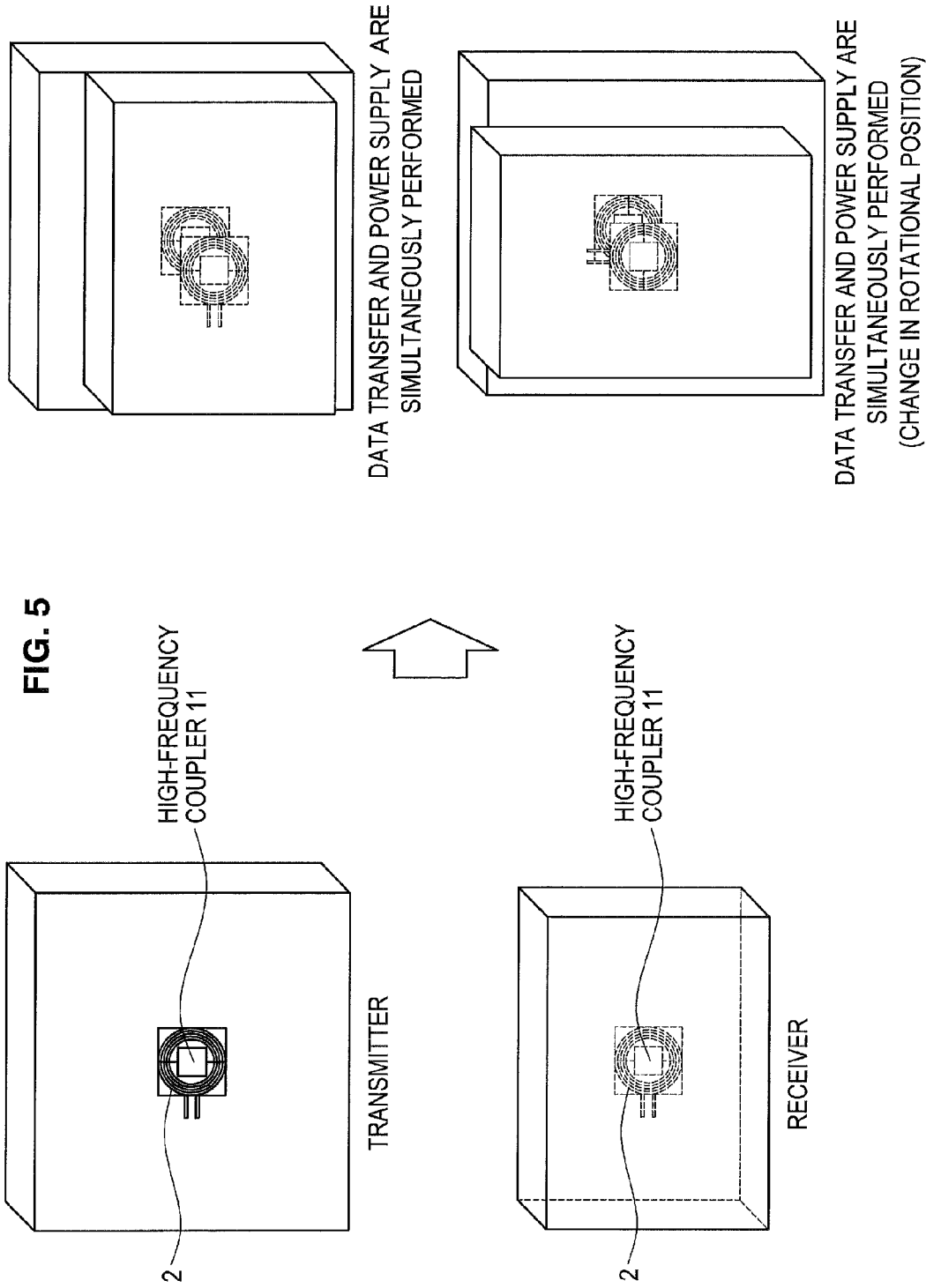

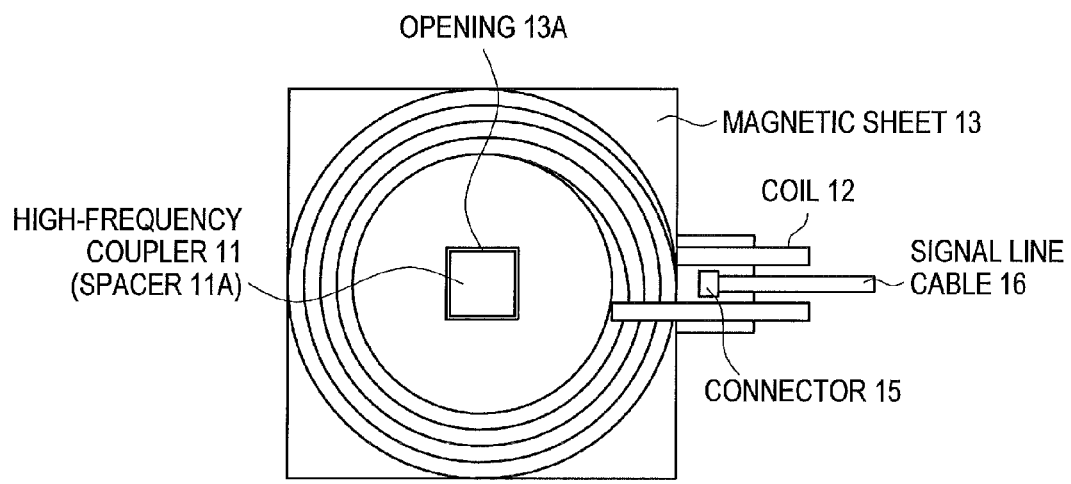
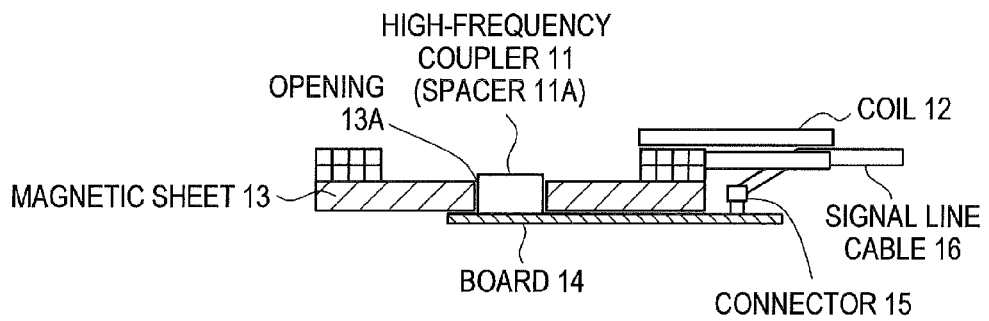

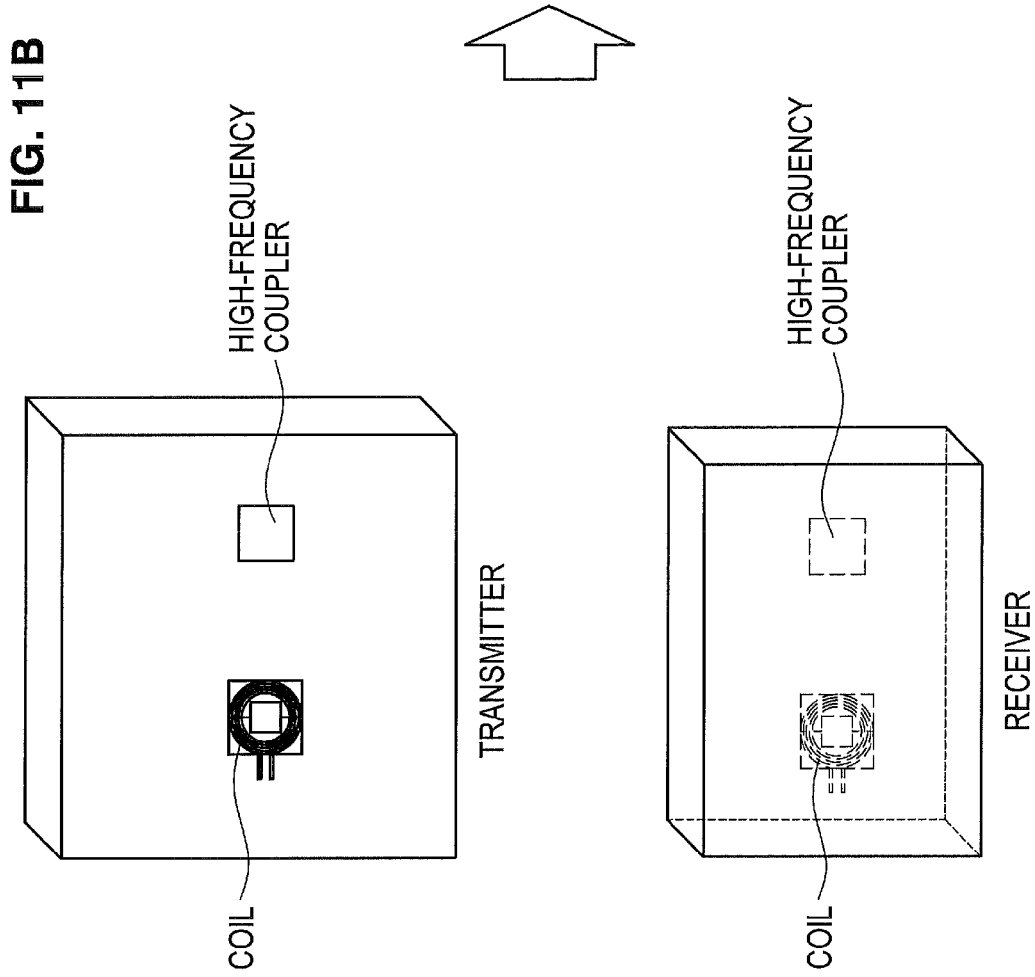

DATA TRANSFER AND POWER SUPPLY ARE NOT
ABLE TO BE PERFORMED SIMULTANEOUSLY

COMMUNICATION APPARATUS AND COMMUNICATION SYSTEM

CROSS-REFERENCE TO RELATED APPLICATION

The present application claims priority from Japanese Patent Application No. JP 2011-141584 filed in the Japanese Patent Office on Jun. 27, 2011, the entire content of which is incorporated herein by reference.

BACKGROUND

The present technology relates to a communication apparatus and a communication system performing communication by proximity wireless transfer using a weak UWB signal, and more particularly, to a communication apparatus and a communication system performing communication by proximity wireless transfer in combination with non-contact power supply by electromagnetic induction, magnetic field resonance, or the like.

An example of a non-contact communication technology applicable to high-rate communication includes proximity wireless transfer technology "TransferJet" (trademark) (for example, see www.transferjet.org/ja/index.html (as of Jun. 23, 2011)). The proximity wireless transfer technology basically uses a scheme of transferring a signal by a coupling action of an induction electric field. A communication apparatus using the proximity wireless transfer technology includes a communication circuit unit that processes a high-frequency signal, a coupling electrode that is provided to be separated from a ground by a given height, and a resonance unit that efficiently supplies the high-frequency signal to the coupling electrode. In the specification, the coupling electrode or a unit including the coupling electrode and the resonance unit is referred to as a "high-frequency coupler" or a "coupler."

As one of the characteristics of the proximity wireless transfer technology, high-rate data transfer of about 100 Mbps is realized using a weak ultra wide band (UWB) signal. Further, as another characteristic of the proximity wireless transfer technology, a transmission power is low. Therefore, since an electric field intensity (radio wave strength) is equal to or less than a predetermined level at a position 3 meters away from wireless equipment, that is, the electric field intensity is weak in a radio signal to the degree of a noise level in another wireless system located in the neighborhood of the wireless equipment, a user can use the weak radio signal without acquisition of a license (for example, see Japanese Radio Law Enforcement regulations (Radio Administrative Committee Rule No. 14 in 1950) Article 6.1.1).

For example, a communication apparatus in which a coupling electrode and a ground including a stub serving as a resonance unit are formed of a metal plate and which performs proximity wireless transfer has been suggested (for example, see Japanese Unexamined Patent Application Publication No. 2008-154267, FIG. 4). Further, an electric field coupler in which a coupling electrode is formed of a strip-shaped conductor and the volume of the metal is reduced, and a communication apparatus have been suggested (for example, Japanese Patent No. 4650536, FIG. 5).

A composite communication apparatus, in which the proximity wireless transfer technology is combined with electromagnetic induction type non-contact communication such as near field communication (NFC) which is a representative example, has been suggested (for example, Japanese Unexamined Patent Application Publication No. 2010-213197). In the composite communication apparatus, a coupling electrode of a high-frequency coupler is formed in the vicinity of an antenna coil for the electromagnetic induction type non-contact communication. An authentication or billing process associated with data transfer is performed through the electromagnetic induction type non-contact communication and large-capacity data is transferred through proximity wireless transfer, so that the communication processes can be completed by a single operation of a user and in a sense of the same access time as the time of the authentication and billing process of the related art.

Further, non-contact power supply of supplying power, rather than data, in a non-contact way has been known. In general, a coil is provided in each of a power reception apparatus and a power supply apparatus and non-contact power supply is performed by electromagnetic induction, magnetic field resonance, or the like. In such a non-contact power supply, a magnetic flux passing through a coil is interlinked with the metal such as a board inside an apparatus, and a problem may arise in that heat is generated in the communication apparatus by an eddy current occurring due to the electromagnetic induction. Therefore, a method of blocking the magnetic flux by a magnetic sheet to prevent the eddy current caused by the electromagnetic induction from occurring has been used (for example, see International Publication WO2007/080820).

FIG. 9A is a diagram illustrating the configuration of a coil (for power supply or power reception) disposed on a magnetic sheet, when viewed from an upper surface. FIG. 9B is a diagram illustrating the cross-sectional configuration of a non-contact power supply unit shown in FIG. 9A. A metal such as a board inside the apparatus is located below the magnetic sheet, although not illustrated in the drawing. Since the magnetic flux generated by the coil is blocked by the magnetic sheet, the magnetic flux does not reach the metal such as a board inside the apparatus. Accordingly, no heat is generated due to the eddy current inside the apparatus.

Hereinafter, a composite communication apparatus in which the proximity wireless transfer is combined not with the electromagnetic induction type non-contact communication but with the non-contact power supply realized by the electromagnetic induction will be examined. Since the composite communication apparatus can perform power supply and high-rate data transfer without using a cable, the convenience for a user is improved.

The coupling electrode of the high-frequency coupler is formed of a metal. Therefore, when the high-frequency coupler is disposed in the vicinity of the coil for power supply or power reception, the magnetic flux passing through the coil is interlinked with the metal portion such as a ground, and thus heat is generated due to the eddy current occurring due to the electromagnetic induction. Further, when the high-frequency coupler is disposed below the magnetic sheet to block the magnetic flux, a high-frequency wave signal of the proximity wireless transfer is blocked together, thereby deteriorating communication performance. For this reason, the disposition of the coupling electrode and the non-contact power supply coil is a technical task.

When the coupling electrode is disposed to be close to the non-contact power supply coil, there is an advantage in that touch points of the data transfer and the non-contact power supply become singular. FIG. 10A is a diagram illustrating the high-frequency coupler disposed in the vicinity of the central portion of the coil (for power supply or power reception) when viewed from the upper surface. FIG. 10B is a diagram illustrating the cross-sectional configuration of the high-frequency coupler and the coil. In the illustrated example, the high-frequency coupler is disposed on the magnetic sheet together with the coil. The metal such as the board inside the apparatus is located below the magnetic sheet, although not illustrated in the drawing. Since the magnetic flux generated by the coil is blocked by the magnetic sheet, the magnetic flux does not reach the inside of the apparatus below the magnetic sheet. However, it is apparent that the eddy current is generated due to the electromagnetic induction and thus heat is generated since the magnetic flux passing through the coil is interlinked with the metal portion such as a ground in the high-frequency coupler.

On the other hand, the high-frequency coupler can be considered to be disposed to be separated from the coil for the power supply or the power reception to avoid the influence of the magnetic flux from the coil for the power supply or the power reception. FIG. 11A is a diagram illustrating a coil (for power supply or power reception) and a high-frequency coupler formed to be separated from each other in a communication apparatus. In this case, to simultaneously perform power supply and high-rate data transfer by a single operation of a user, a transmitter and a receiver have to be designed and manufactured so that the gap between a non-contact power supply unit and a high-frequency coupler is aligned. Therefore, the non-contact power supply unit and the high-frequency coupler may not simultaneously face one another. Further, in regard to the touch points of the transmitter and the receiver, the non-contact power supply unit and the high-frequency coupler have to be disposed to face one another, and thus an operation of the user is troublesome. FIG. 11B is a diagram illustrating the non-contact power supply unit and the high-frequency coupler simultaneously facing one another between the transmitter and the receiver to simultaneously perform the power supply and the data transfer.

FIG. 12 is a diagram illustrating an example in which the non-contact power supply unit and the high-frequency coupler do not simultaneously face one another between the transmitter and the receiver since the gap between the non-contact power supply unit and the high-frequency coupler is not aligned between the transmitter and the receiver. When the gap between the non-contact power supply unit and the high-frequency coupler is not aligned, the touch points do not coincide with each other at the time of power supply and the time of data transfer. That is, when the transmitter and the receiver neighbor each other, the non-contact power supply unit and the high-frequency coupler may not simultaneously face one another, and thus the power supply and the high-rate data transfer may not be simultaneously performed through a single operation of the user. For example, it is necessary for the user to perform an operation of determining a position for communication to perform the data transfer and then changing the position to an optimum position for power supply to perform the power supply.

SUMMARY

It is desirable to provide an excellent communication apparatus and communication system capable of simultaneously performing power supply and high-rate data transfer without using a cable in combination with non-contact power supply using electromagnetic induction and communication using proximity wireless transfer.

The present technology has been made in view of the above circumstances, and a first aspect thereof provides a communication apparatus including a magnetic sheet that includes an opening, a non-contract power supply coil that is disposed on the magnetic sheet, a high-frequency coupler that includes a coupling electrode, a ground, and a resonance unit configured to increase an amount of current flowing into the coupling electrode, and is configured such that the coupling electrode appears on the magnetic sheet via the opening, and a communication circuit unit that processes a high-frequency signal transmitted to and received from the coupling electrode.

A second aspect of the present technology provides the communication apparatus according to the first aspect, wherein a minute dipole configured by a line segment connecting a center of charge accumulated in the coupling electrode and a center of image charge accumulated in the ground is formed, and the high-frequency signal is transferred to a communication partner disposed to face the communication apparatus so that an angle θ formed between the communication partner and a direction of the minute dipole is approximately 0 degrees.

A third aspect of the present technology provides the communication apparatus according to the first aspect, wherein the magnetic sheet includes the opening in a vicinity of a central portion of the non-contact power supply coil, the coupling electrode is disposed inside the non-contact power supply coil and appears on the magnetic sheet via the opening, and the ground and the resonance unit are hidden below the magnetic sheet.

A fourth aspect of the present technology provides the communication apparatus according to the first aspect, wherein the high-frequency coupler includes a board, the ground formed in a conductor pattern on the board, the coupling electrode held on the board from the ground at a predetermined height, and the resonance unit disposed on the board, the magnetic sheet includes the opening in a vicinity of a central portion of the non-contact power supply coil, the coupling electrode is disposed inside the non-contact power supply coil and appears on the magnetic sheet via the opening, and the board including the ground and the resonance unit is hidden below the magnetic sheet.

A fifth aspect of the present technology provides the communication apparatus according to the first aspect, wherein the coupling electrode is formed of a conductor that has a strip shape so as to be reduced in volume.

A sixth aspect of the present technology provides the communication apparatus according to the third aspect, further including: a connector configured to mount a signal line cable connecting the coupling electrode to the communication circuit unit.

A seventh aspect of the present technology provides the communication apparatus according to the sixth aspect, wherein the connector is disposed inside the non-contact power supply coil and appears together with the coupling electrode on the magnetic sheet via the opening, and the signal line cable mounted on the connecter crosses an upper surface of the non-contact power supply coil to be connected to the communication circuit unit.

An eighth aspect of the present technology provides the communication apparatus according to the sixth aspect, wherein the connector is disposed outside the non-contact power supply coil, and the signal line cable mounted on the connecter is connected to the communication circuit unit without crossing an upper surface of the non-contact power supply coil.

A ninth aspect of the present technology provides the communication apparatus according to the sixth aspect, wherein the connector is disposed below the magnetic sheet, and the signal line cable mounted on the connecter is connected to the communication circuit unit without crossing an upper surface of the non-contact power supply coil.

A tenth aspect of the present technology provides the communication apparatus according to the fourth aspect, wherein the communication circuit unit is mounted on the board and is connected to the coupling electrode via a signal transmission line formed of a stripline formed in a layer inside the board.

An eleventh aspect of the present technology provides the communication apparatus according to the fourth aspect, wherein the communication circuit unit is mounted on the board and is connected to the coupling electrode via a signal transmission line formed of a micro-stripline formed in a surface of the board.

A twelfth aspect of the present technology provides a communication system provided with a plurality of communication apparatuses each including a non-contact power supply coil, a magnetic sheet that is disposed below the non-contact power supply coil and includes an opening in a vicinity of a central portion of the non-contact power supply coil, and a high-frequency coupler configured to include a coupling electrode, a ground, and a resonance unit, and configured such that the coupling electrode appears on the magnetic sheet via the opening.

Here, a "system" refers to a logical collection of a plurality of apparatuses (or functional modules realizing specific functions) irrespective of whether the apparatuses or the functional modules are provided in a single casing.

According to the embodiments of the present technology described above, it is possible to provide the excellent communication apparatus and the excellent communication system capable of simultaneously performing the power supply and the high-rate data transfer without using a cable in combination with the non-contact power supply using electromagnetic induction and the communication using the proximity wireless transfer.

According to the embodiments of the present technology described above, the coupling electrode and the power supply coil are disposed so that the centers of the coupling electrode and the power supply coil are almost the same in the composite communication apparatus in which the non-contact power supply and the proximity wireless transfer are combined. Therefore, the touch points coincide with other at the time of power supply and the time of data transfer. Accordingly, when the counter communication apparatuses having the same disposition of the coupling electrode and the power reception coil neighbor each other to simultaneously perform the power supply and the high-rate data transfer, the degree of freedom of arrangement between the communication apparatuses is improved.

According to the embodiments of the present technology described above, the centers of the coupling electrode and the coil for power supply or power reception are almost the same in the communication apparatuses. Therefore, since the non-contact power supply unit can be integrated with the high-frequency coupler so that the communication apparatus is miniaturized, efficiency (space efficiency) with which an information apparatus is equipped is improved.

Other features and advantages of the embodiments of the present technology will be apparent from the detailed description of the embodiments and the accompanying drawings described below.

BRIEF DESCRIPTION OF THE DRAWINGS

FIG. 2 is a perspective view illustrating a coupling electrode formed of a strip-shaped conductor;

FIG. 5 is a diagram illustrating a transmitter and a receiver having the same arrangement of the coupling electrode and the coil neighboring each other without a constraint on a rotational position;

FIG. 6A is a diagram illustrating the configuration of a transmission and reception unit of a composite communication apparatus according to another embodiment of the present technology, when viewed from an upper surface;

FIG. 6B is a diagram illustrating the cross-sectional configuration of the transmission and reception unit of the composite communication apparatus shown in FIG. 6A;

FIG. 11B is a diagram illustrating the non-contact power supply unit and the high-frequency coupler simultaneously facing one another between a transmitter and a receiver to simultaneously perform power supply and data transfer;

DETAILED DESCRIPTION OF THE EMBODIMENTS

Figure 1A:
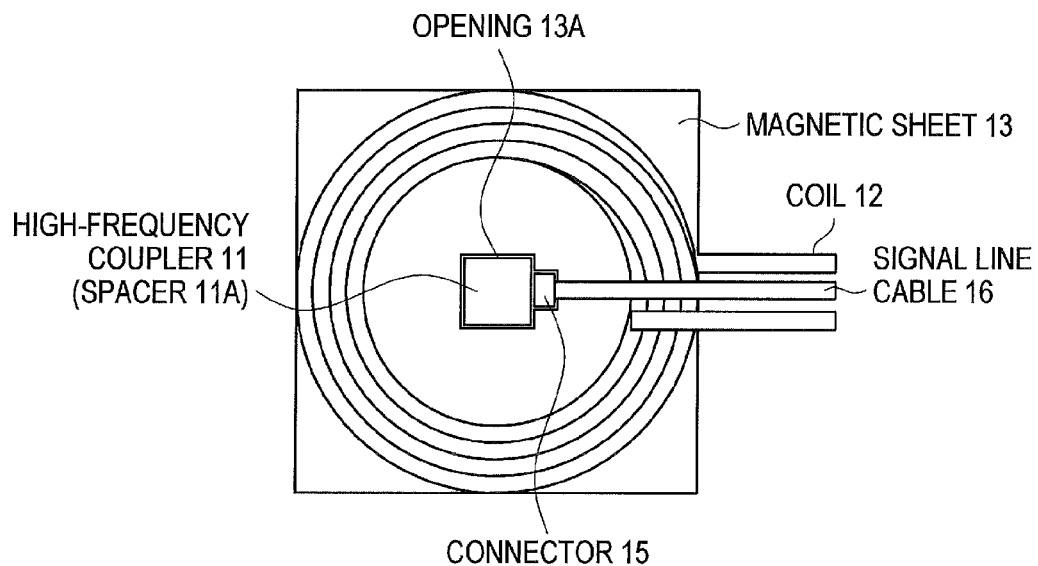
FIG. 1A is a diagram illustrating the configuration of a transmission and reception unit of a composite communication apparatus according to an embodiment of the present technology, when viewed from an upper surface.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

A composite communication apparatus, in which non-contact power supply using electromagnetic induction and communication using proximity wireless transfer are combined, is capable of simultaneously performing power supply and high-rate data transfer without using a cable. The non-contact power supply is technology known to those skilled in the art (for example, see International Publication WO2007/080820). The principle of a proximity wireless transfer technology will be described.

Figure 13:
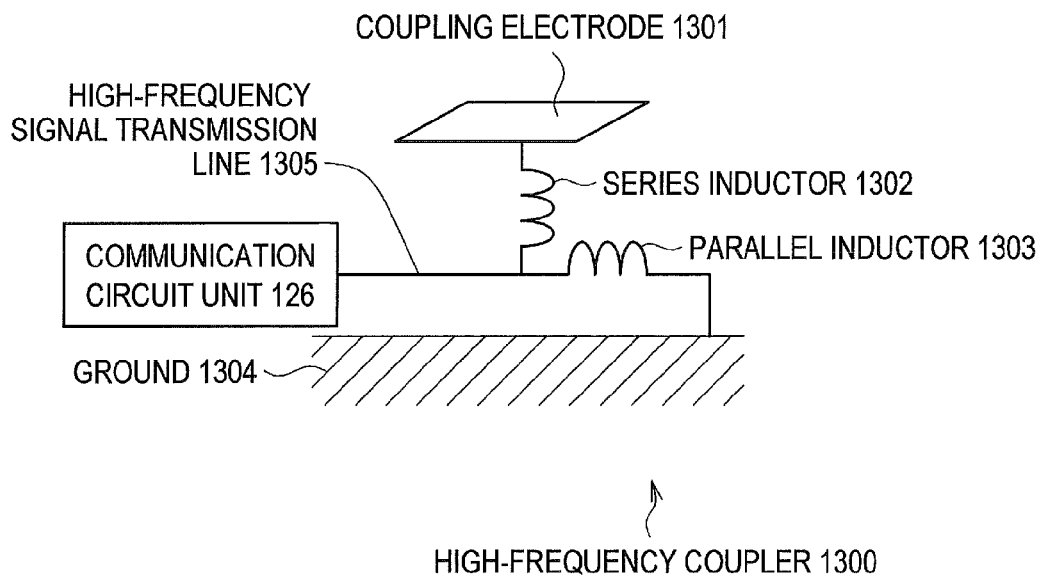
FIG. 13 is a diagram schematically illustrating the basic configuration of a high-frequency coupler used in proximity wireless transfer.

In the proximity wireless transfer, a high-frequency coupler shown in FIG. 13 is used as an antenna element. A high-frequency coupler 1300 includes a plate-shaped coupling electrode 1301 and a resonance unit including a series inductor 1302 and a parallel inductor 1303. The high-frequency coupler 1300 is connected to a communication circuit unit 1306 via a high-frequency signal transmission line 1305.

A high-frequency communication signal flows into the coupling electrode 1301, and therefore charge is accumulated in the coupling electrode 1301. At this time, the current flowing into the coupling electrode 1301 via the transmission line is amplified by a resonance action of the resonance unit including the series inductor 1302 and the parallel inductor 1303, and therefore larger charge can be accumulated. Further, when charge Q may be stored in the coupling electrode 1301, image charge –Q may be stored in the ground 1304.

Here, when the point charge Q is present outside a planar conductor, the image charge –Q (which is virtual charge with which a surface charge distribution is substituted) is present inside the planar conductor, which is described in, for example, "Electromagnetics" (pages 94 to 57, published by Shokabo Pub. Co., Ltd) by Tadashi Mizoguchi and is known to those skilled in the art. In FIG. 13, the ground 1304 corresponds to a planar conductor and the charge accumulated in the coupling electrode 1301 corresponds to the point charge Q present outside the planar conductor. Theoretically, the planar conductor is indefinitely large. However, practically, the distance between the point charge Q and the end of the conductor surface may be sufficiently larger than the (shortest) distance between the point charge Q and the conductor surface, although the plane is not indefinitely large.

As a result of the accumulation of the point chart Q and the image charge –Q, a minute dipole is formed by a line segment connecting the center of the charge Q accumulated in the coupling electrode 1301 and the center of the image charge –Q accumulated in the ground 1304 (to be exact, the charge Q and the image charge –Q have a volume and the minute dipole is formed so as to connect the center of the charge Q and the image charge –Q). Here the "minute dipole" means that "the distance between charges of an electric dipole is very short." For example, the "minute dipole" is described in, for example, "Antenna and Radio Wave Propagation" (pages 16 to 18, published by Corona Pub. Co., Ltd) by Yasuto Mushiake. Further, a transverse wave component $E_\theta$ of an electric field, a longitudinal wave component $E_R$ of the electric field, and a magnetic field $H_\phi$ of the rotation of the minute dipole are generated by the minute dipole.

Figure 14:
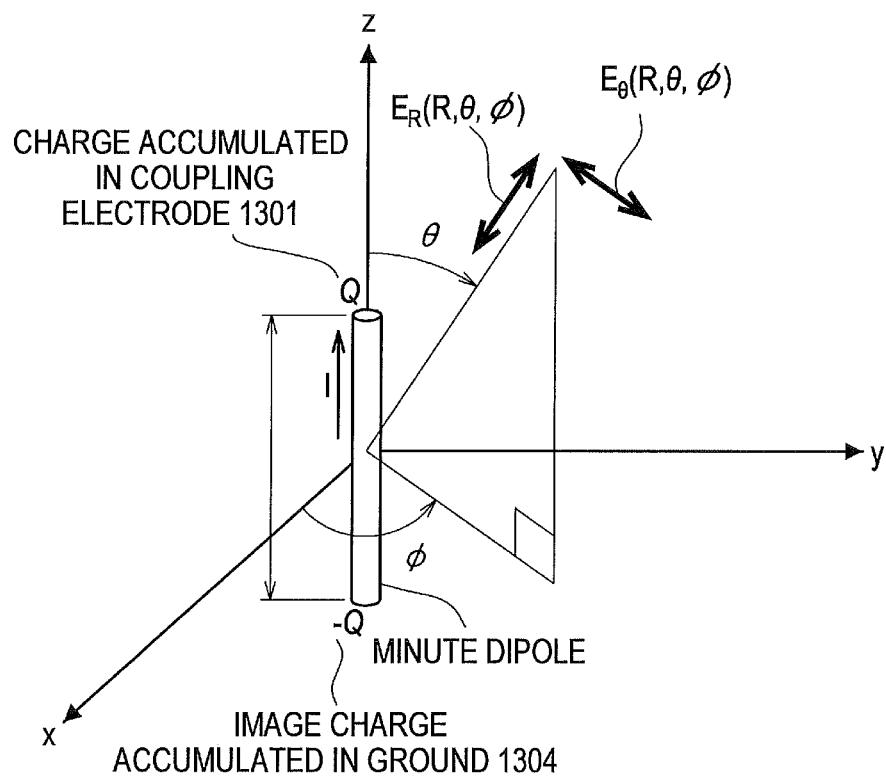
FIG. 14 is a diagram illustrating an electric field generated by a minute dipole.

FIG. 14 is a diagram illustrating the electric field generated by the minute dipole. As shown in FIG. 14, the transverse wave component $E_\theta$ of the electric field oscillates in a direction perpendicular to a propagation direction and the longitudinal wave component $E_R$ of the electric field oscillates in a direction parallel to the propagation direction. The magnetic field $H_\phi$ is generated in the rotation of the minute dipole (not shown). An electromagnetic field generated by the minute dipole is expressed by Equation (1) to Equation (3) below. In the equations, a component in inverse proportion to the cube of a distance R refers to an electrostatic magnetic field, a component in inverse proportion to the square of the distance R refers to an induction electromagnetic field, and a component in inverse proportion to the distance R refers to a radiation electromagnetic field. Since the induction electromagnetic field is considerably attenuated with a distance, the induction electromagnetic field corresponds to a "near field." On the other hand, since the radiation electromagnetic field is slightly attenuated with a distance, the radiation electromagnetic field corresponds to a "far field."

$$E_\theta = \frac{pe^{-jkR}}{4\pi\varepsilon}\left(\frac{1}{R^3} + \frac{jk}{R^2} - \frac{k^2}{R}\right)\sin\theta \quad (1)$$

$$E_R = \frac{pe^{-jkR}}{2\pi\varepsilon}\left(\frac{1}{R^3} + \frac{jk}{R^2}\right)\cos\theta \quad (2)$$

$$H_\phi = \frac{j\omega pe^{-jkR}}{4\pi}\left(\frac{1}{R^2} + \frac{jk}{R}\right)\sin\theta \quad (3)$$

In Equation (1) to Equation (3) above, a moment p and the distance R of the minute dipole are defined as in Equation (4) and Equation (5) below, respectively.

$$p = Ql \quad (4)$$

$$R = \sqrt{x^2 y^2 + z^2} \quad (5)$$

To suppress an interfering wave to a peripheral system, the longitudinal wave component $E_R$ including no component of the radiation electromagnetic field is considered to be preferably used while suppressing the transverse wave component $E_\theta$ including the component of the radiation electromagnetic field. This is because the transverse wave component $E_\theta$ of the electric field includes the radiation electromagnetic field corresponding to the far field, but the longitudinal wave component $E_R$ does not include the radiation electromagnetic field, as understood from Equation (1) and Equation (2) above.

From Equation (2) above, it can be understood that the longitudinal wave component $E_R$ is the maximum when an angle $\theta$ formed with the direction of the minute dipole is equal to 0 degrees. Accordingly, to perform the proximity wireless transfer using the longitudinal wave component $E_R$ efficiently, the high-frequency coupler of a communication partner is preferably disposed to face the communication apparatus so that the angle $\theta$ formed between the communication partner and the direction of the minute dipole becomes approximately 0 degrees and a high-frequency electric field signal may be transmitted. Further, when the resonance unit including the series inductor 1302 and the parallel inductor 1303 increases the amount of current of a high-frequency signal flowing into the coupling electrode 131, the larger charge Q can be accumulated. As a result, since the moment p of the minute dipole formed by the charge Q accumulated in the coupling electrode 1301 and the image charge –Q accumulated in the ground 1304 can be larger, a high-frequency electric field signal formed from the longitudinal wave component $E_R$ can be efficiently transmitted in the propagation direction in which the angle $\theta$ formed with the direction of the minute dipole becomes approximately 0 degrees.

Next, the configuration of a composite communication apparatus, in which non-contact power supply using electromagnetic induction and communication using proximity wireless transfer are combined, will be described.

Figure 1B:
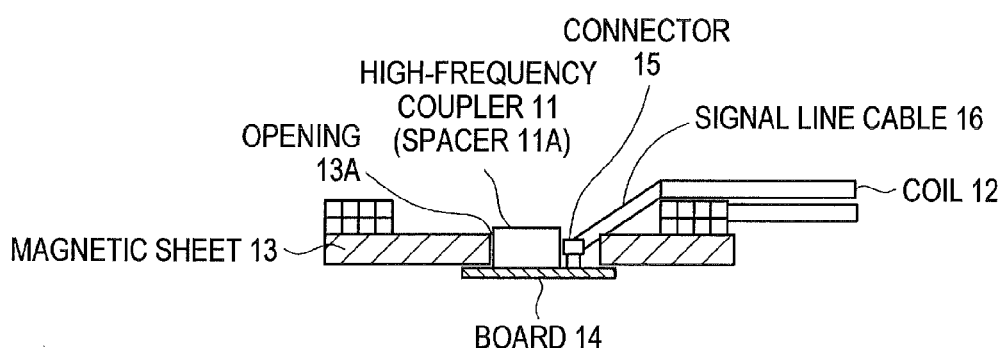
FIG. 1B is a diagram illustrating the cross-sectional configuration of the transmission and reception unit of the composite communication apparatus shown in FIG. 1A.

FIG. 1A is a diagram illustrating the configuration of a transmission and reception unit of the composite communication apparatus according to an embodiment of the present technology, when viewed from an upper surface. FIG. 1B is a diagram illustrating the cross-sectional configuration of the transmission and reception unit.

Figure 10A:
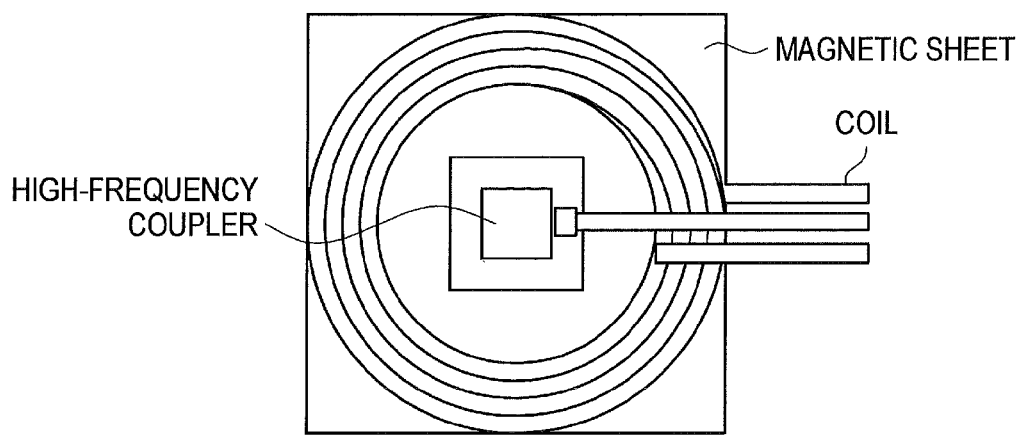
FIG. 10A is a diagram illustrating a high-frequency coupler disposed in the vicinity of the central portion of the coil (for power supply or power reception) when viewed from the upper surface.
Figure 10B:
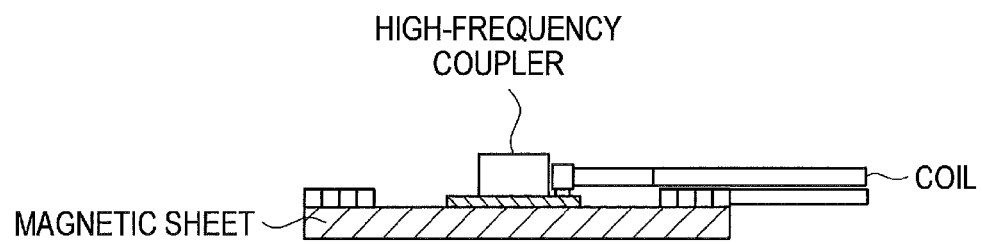
FIG. 10B is a diagram illustrating the cross-sectional configuration of the non-contact power supply shown in FIG. 10A.
Figure 11A:
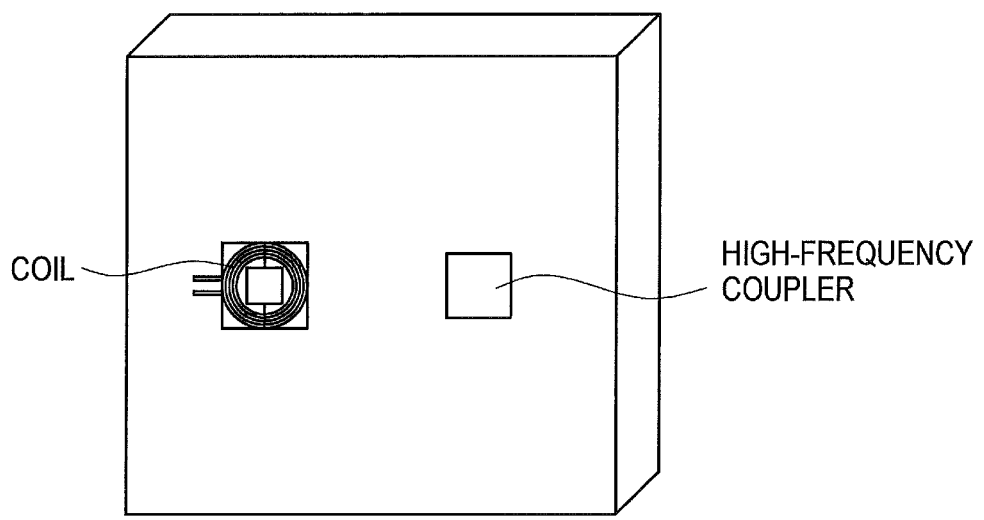
FIG. 11A is a diagram illustrating a coil (for power supply or power reception) and a high-frequency coupler formed to be separated from each other in a communication apparatus.
Figure 12:
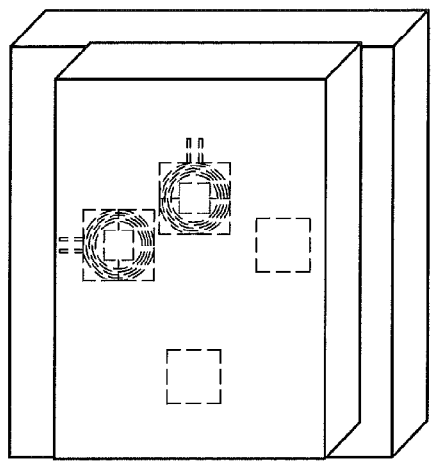
FIG. 12 is a diagram illustrating an example in which the non-contact power supply unit and the high-frequency coupler do not simultaneously face one another between the transmitter and the receiver.

The transmission and reception unit shown in FIGS. 1A and 1B is the same as that shown in FIGS. 10A and 10B in that the transmission and reception unit includes a high-frequency coupler 11, a non-contact power supply (power supply or power reception) coil 12, and a magnetic sheet 13 and the high-frequency coupler 11 is disposed in the vicinity of the central portion of the coil 12. Although not illustrated in the drawings, a metal such as a board inside the communication apparatus is located below the magnetic sheet 13.

The high-frequency coupler 11 is disposed in the vicinity of the central portion of the coil 12. However, the configuration of the high-frequency coupler 11 is different from that shown in FIGS. 10A and 10B in that an opening 13A is formed in a portion of the magnetic sheet 13 corresponding to the central portion of the coil 12 and a part of a spacer 11A including a coupling electrode in the high-frequency coupler 11 is exposed to the outside (transfer and reception surface) via the opening 13A. To mount a signal line cable 16 on the high-frequency coupler 11, a connector 15 is also exposed via the opening 13A inside the coil 12. The signal line cable 16 connected to the connector 15 crosses the upper surface of the coil 12 in the drawings and the other end of the signal line cable 16 is connected to a communication circuit unit (not shown) that processes a high-frequency signal transmitted to and received from the high-frequency coupler 11.

In the configuration shown in FIGS. 1A and 1B, the high-frequency coupler 11 is exposed to the transfer and reception surface from the opening 13A formed in the magnetic sheet 13. Accordingly, electric field coupling can be realized between the high-frequency couplers 11 of a transmitter and a receiver disposed to face each other at the time of the proximity wireless transfer.

In the configuration shown in FIGS. 1A and 1B, most of a board 14 on which the high-frequency coupler 11 is mounted is held so as to be hidden below the magnetic sheet 13. Accordingly, even when a magnetic flux is generated from the coil 12 at the time of the non-contact power supply, the magnetic flux is blocked by the magnetic sheet 13. Therefore, the magnetic flux does not reach most of the metal portion of the board 14 from the ground or the resonance unit (both of which are not shown) of the high-frequency coupler 11, and therefore no heat is generated due to an eddy current.

Figure 4:
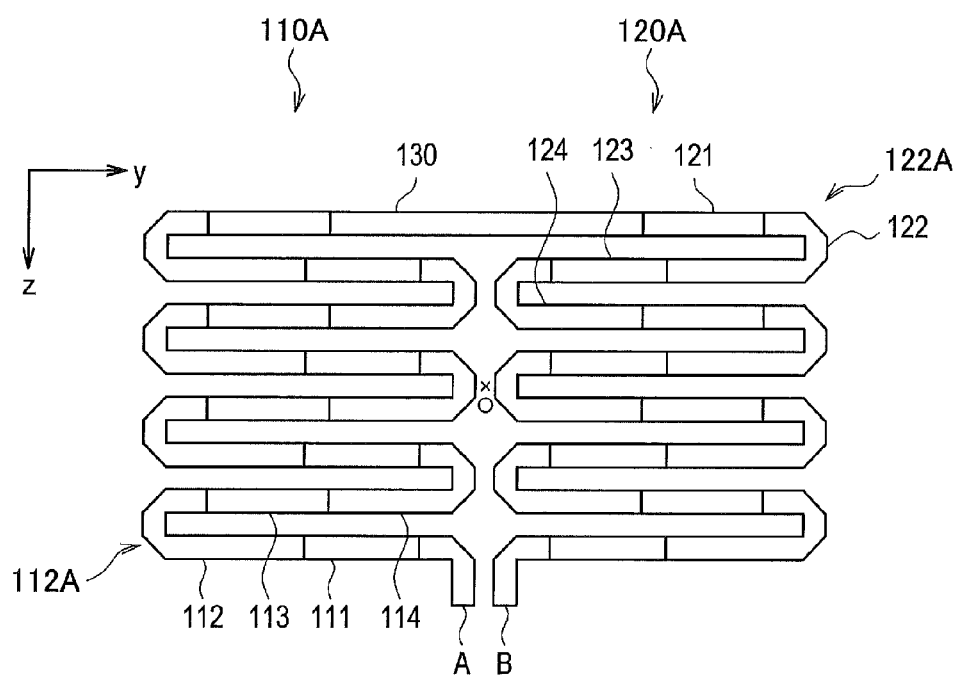
FIG. 4 is a diagram illustrating the expanded coupling electrode 100 formed of the strip-shaped conductor.

As described above with reference to FIG. 13, the high-frequency coupler 11 includes a coupling electrode, a resonance unit configured to increase the amount of current flowing into the coupling electrode, and a ground. The high-frequency coupler 11 shown in FIGS. 1A and 1B has a structure in which the coupling electrode is held by the spacer 11A formed of an insulator (dielectric body) from the ground at a predetermined height, for example, as shown in FIG. 4 of Japanese Unexamined Patent Application Publication No. 2008-154267. The ground is formed in a conductive pattern formed in the board 14. Further, the resonance unit may be a stub formed in the conductive pattern in the board 14.

Here, the coupling electrode is preferably formed of a conductor reduced in volume in a strip shape and is buried inside the spacer 11A formed of an insulator. The conductor is preferably formed in the strip shape so that the volume of the metal portion can be likewise decreased to obtain an operation of the coupling electrode, and therefore the coupling electrode scarcely receives an influence of the eddy current caused due to the magnetic flux generated from the coil 12 at the time of non-contact power supply.

For example, Japanese Unexamined Patent Application Publication No. 2009-10111, which has already been assigned to the applicant, discloses a configuration in which a coupling electrode is formed of a line-shaped conductor and is folded in a coil shape to considerably decrease the size of the coupling electrode. Further, Japanese Patent No. 4650536 discloses a coupling electrode formed of a conductor reduced in volume in a strip shape.

Figure 3:
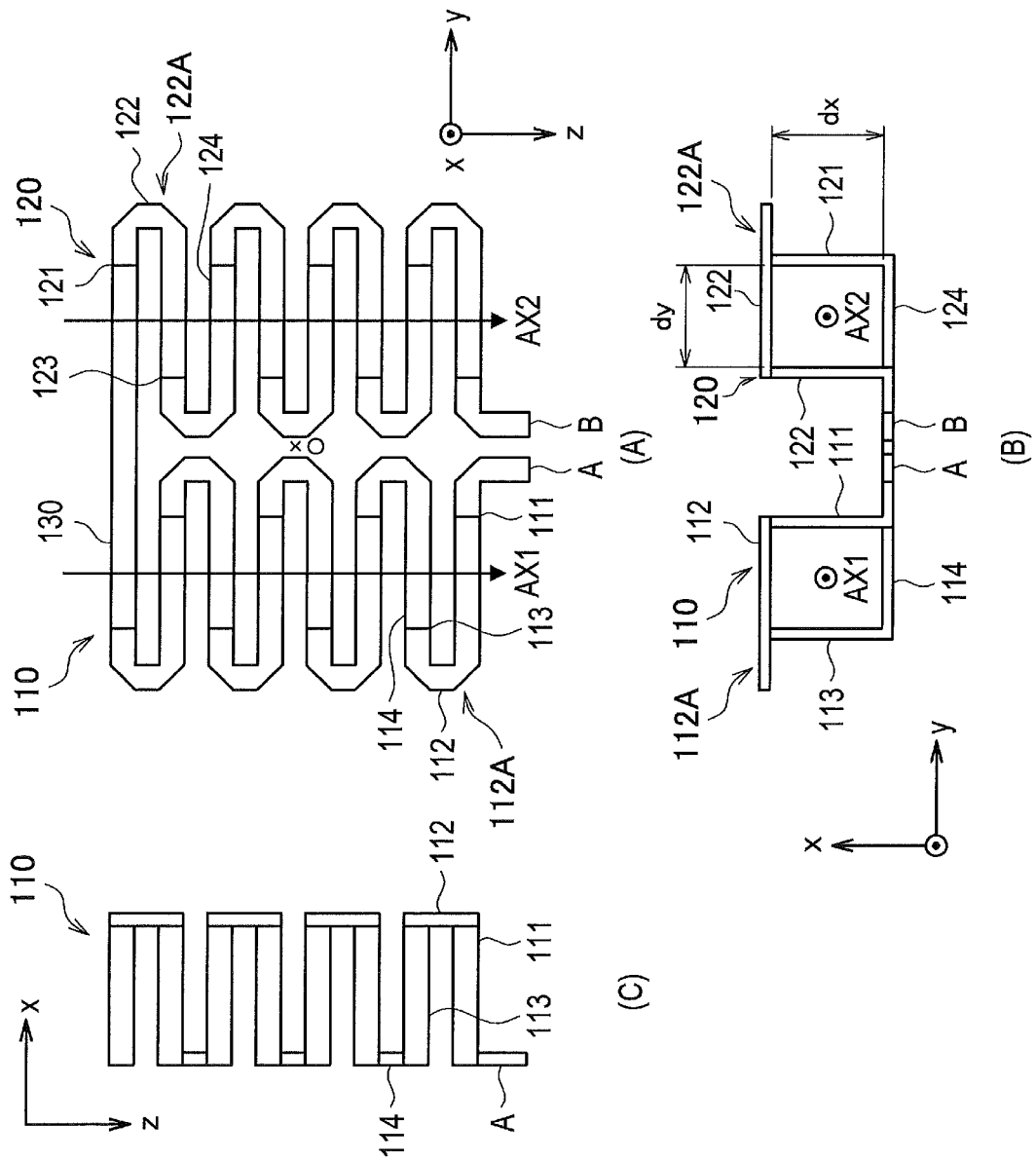
FIGS. 3A to 3C are diagrams illustrating a coupling electrode 100 formed of the strip-shaped conductor.

FIG. 2 is a perspective view illustrating a coupling electrode 100 formed of a strip-shaped conductor. FIG. 3A is a top view illustrating the coupling electrode 100 formed of the strip-shaped conductor (a diagram illustrating the coupling electrode viewed in the positive direction of the x axis). FIG. 3B is a front view illustrating the coupling electrode 100 formed of the strip-shaped conductor (a diagram illustrating the coupling electrode viewed in the positive direction of the z axis). FIG. 3C is a side view illustrating the coupling electrode 100 formed of the strip-shaped conductor. FIG. 4 is a diagram illustrating the expanded coupling electrode 100 formed of the strip-shaped conductor. The coupling electrode 100 shown in the drawings is assumed to be buried inside the spacer 11A formed of the insulator.

The coupling electrode 100 includes a terminal A connected to the resonance unit (not shown), a short-circuited terminal B, a first strip-shaped coil 110, a second strip-shaped coil 120, and a connection portion 130. The first strip-shaped coil 110 and the second strip-shaped coil 120 are disposed so that coil axes AX1 and AX2 are parallel to each other. The connection portion 130 connects one end of the first strip-shaped coil 110 to one end of the second strip-shaped coil 120. Accordingly, on the formation plane (yz plane) of the strip-shaped coil 100, a central portion O of the strip-shaped coil 100 is surrounded by the first strip-shaped coil 110, the second strip-shaped coil 120, and the connection portion 130.

The first strip-shaped coil 110, the second strip-shaped coil 120, and the connection portion 130 have the predetermined same width except for partial folded portions or the like. The width is set based on the strength, the resistance value, or the like of the coupling electrode 100. The first strip-shaped coil 110, the second strip-shaped coil 120, and the connection portion 130 have an electric length of half of a wavelength with respect to the frequency of the high frequency signal. Since the first strip-shaped coil 110, the second strip-shaped coil 120, and the connection portion 130 have such an electric length, the high-frequency signal resonates in the strip-shaped coil 100 when the high-frequency signal is input to the coupling electrode 100 via the resonance unit. As a result, an alternating magnetic flux is generated in the first strip-shaped coil 110 and the second strip-shaped coil 120. The electric field of a longitudinal wave oscillating in the coupling direction (x-axis direction) is generated at the central portion O of the strip-shaped coil 100 by the alternating magnetic flux.

The winding direction of the first strip-shaped coil 110 and the second strip-shaped coil 120 are reverse to each other with the connection portion 130 interposed therebetween. The coupling electrode 100 has an electric length of half of a wavelength with respect to the high-frequency signal. The rotation direction of the coupling electrode 100 is reversed at the position (middle position) of a quarter of the wavelength. That is, the winding direction of the first strip-shaped coil 110 is set in a direction in which the magnetic flux is generated in the positive direction of the coil axis AX1 when the direct current flows from the terminal A to the terminal B. On the other hand, since the winding direction of the second strip-shaped coil 120 is reversed, the winding direction of the second strip-shaped coil 120 is set as a direction in which the magnetic flux is generated in the positive direction of the coil axis AX2. Further, when the high-frequency signal is input and resonates in the strip-shaped coil 100, one of the magnetic fluxes generated in the first strip-shaped coil 110 and the second strip-shaped coil 120 is reversed and surrounds the central portion O. As a result, the coupling electrode 100 can strengthen the electric field of the longitudinal wave generated at the central portion O.

The first strip-shaped coil 110 and the second strip-shaped coil 120 have meandering strip-shaped line paths 112A and 122A, respectively. The first strip-shaped coil 110 is formed such that the strip-shaped line path 112A is folded at positions indicated by dotted lines in FIG. 4 in a positive or negative direction of the coupling direction (x axis). The second strip-shaped coil 120 is formed such that the strip-shaped line path 122A is folded at positions indicated by dotted lines in FIG. 4 in a positive or negative direction of the coupling direction (x axis).

The first strip-shaped coil 110 is formed such that an internal rising portion 111, an external folded portion 112, an external rising portion 113, and an internal folded portion 114 are repeatedly formed and the coil axis AX1 serves as a center. The second strip-shaped coil 120 is formed such that an external rising portion 121, an external folded portion 122, an internal rising portion 123, and an internal folded portion 124 are repeatedly formed and the coil axis AX2 serves as a center. As shown in FIGS. 2 and 3A, the second strip-shaped coil 120 is formed such that a unit of the coil surface is repeated. As in the first strip-shaped coil 110, a part of the connection 130 connecting the first strip-shaped coil 110 to the second strip-shaped coil 120 on the side of the second strip-shaped coil 120 also forms a part of one coil surface of the second strip-shaped coil 120.

As described above, as in FIGS. 2 to 4, the coupling electrode 100 formed of the strip-shaped conductor is buried inside the spacer formed of an insulator to form the cubed high-frequency coupler 11, as shown in FIGS. 1A and 1B. Since the thin strip-shaped coupling electrode 100 is buried inside the insulator, the mechanical strength is enhanced and the coupling electrode 100 can be held at a predetermined height. Further, since the spacer can be mounted by reflow soldering on the board 14 in which the conductive patterns such as the ground and the resonance pattern are formed, the high-frequency coupler 11 can be easily manufactured.

The configuration of the transmission and reception unit of the composite communication apparatus will be described again with reference to FIGS. 1A and 1B.

In the coil 12, a Q value of the coil can be improved by enlarging the surface area of the conductor by the segmentation of the conductor. Further, to suppress an increase in temperature, the coil 12 may be formed by coiling a litz wire.

As described above, the magnetic sheet 13 serves to block the magnetic flux generated from the coil 12 at the time of the non-contact power supply. Accordingly, the magnetic flux does not reach most of the metal portion of the board 14 covered with the magnetic sheet 13 from the ground (not shown) of the high-frequency coupler 11, and magnetic energy can be prevented from being consumed in the metal. Further, the magnetic sheet 13 serves as a magnetic yoke (which is a soft iron plate that amplifies the adsorption force of a magnet) and also serves to amplify the magnetism.

In the configuration in which the high-frequency coupler is disposed together with the coil (for power supply or power reception) on the magnetic sheet, as in FIGS. 10A and 10B, the magnetic flux passing through the coil is interlinked with the metal portion such as the ground of the high-frequency coupler, and thus may deteriorate due to the eddy current (as described above).

In the composite communication apparatus according to this embodiment, however, as in FIGS. 1A and 1B, the opening 13A is formed in the magnetic sheet 13 so that the coupling electrode portion of the high-frequency coupler 11 is exposed from the opening 13A to the transfer and reception surface, and most of the metal portion such as the ground is hidden below the magnetic sheet 13.

The composite communication apparatus having such a configuration can transfer data and supply power by suppressing the efficiency deterioration of the proximity wireless transfer and the non-contact power supply as far as possible.

In the example of the configuration shown in FIGS. 1A and 1B, the opening 13A of the magnetic sheet 13 is formed in a portion corresponding to the central portion of the coil so that the coupling electrode of the high-frequency coupler 11 is exposed from the central portion of the coil 12 to the transfer and reception surface.

When the coupling electrode of the high-frequency coupler 11 and the central portion of the coil 12 are located at almost the same position, the touch points of the data transfer and the non-contact power supply coincide with each other. Therefore, the degree of freedom of the proximity position is improved during transfer and reception times at which the dispositions of the coupling electrode and the coil are the same. As shown in FIG. 5, by matching the center positions of the coils 12 with each other during the transfer and reception times, the power supply and the high-rate data transfer can be simultaneously performed even when the transmitter and the receiver are approximated in any rotational direction.

In short, since the non-contact power supply coil 12 and the high-frequency coupler 11 are integrated with one another so that the composite communication apparatus according to this embodiment is miniaturized, an efficiency (space efficiency) with which the apparatus is equipped is improved.

In the example of the configuration shown in FIGS. 1A and 1B, the connector 15 configured to mount the signal line cable 16 is formed inside the coil 12 together with the high-frequency coupler 11 and is exposed to the outside via the opening 13A. Thus, when the connector 15 is also disposed inside the coil 12, the board 15 on which the high-frequency coupler 11 is mounted can be made to be compact, and thus the entire composite communication apparatus can be miniaturized. On the other hand, since the signal line cable 16 made of metal crosses the upper surface of the coil 12, the magnetic flux passes through the signal line cable 16 at the time of the non-contact power supply, and thus the problem may arise in that heat is generated due to the eddy current.

FIG. 6A is a diagram illustrating another configuration of a transmission and reception unit of a composite communication apparatus, when viewed from an upper surface. FIG. 6B is a diagram illustrating the cross-sectional configuration of the transmission and reception unit. This configuration is the same as the example of the configuration shown in FIGS. 1A and 1B in that the transmission and reception unit includes the high-frequency coupler 11, the non-contact power supply (power supply or power reception) coil 12, and the magnetic sheet 13, the high-frequency coupler 11 appears in the vicinity of the central portion of the coil 12, and the board 14 on which the high-frequency coupler 11 is mounted is covered with the magnetic sheet 13. Although not illustrated in the drawing, the metal such as the board of the apparatus is located below the magnetic sheet 13. However, this configuration is different from the example of the configuration shown in FIGS. 1A and 1B in that the connector 15 is disposed outside the coil 12.

In the example of the configuration shown in FIGS. 6A and 6B, the signal line cable 16 connected to the connector 15 is connected to the communication circuit unit (not shown) without crossing the upper surface of the coil 12. In this case, because the magnetic flux does not pass through the signal line cable 16 made of metal at the time of the non-contact power supply, the problem of heat being generated due to the eddy current does not arise. Compared with the example of the configuration shown in FIGS. 1A and 1B, however, the size of the board 15 on which the high-frequency coupler 11 is mounted may increase, and thus the entire size of the composite communication apparatus may increase.

Figure 7A:
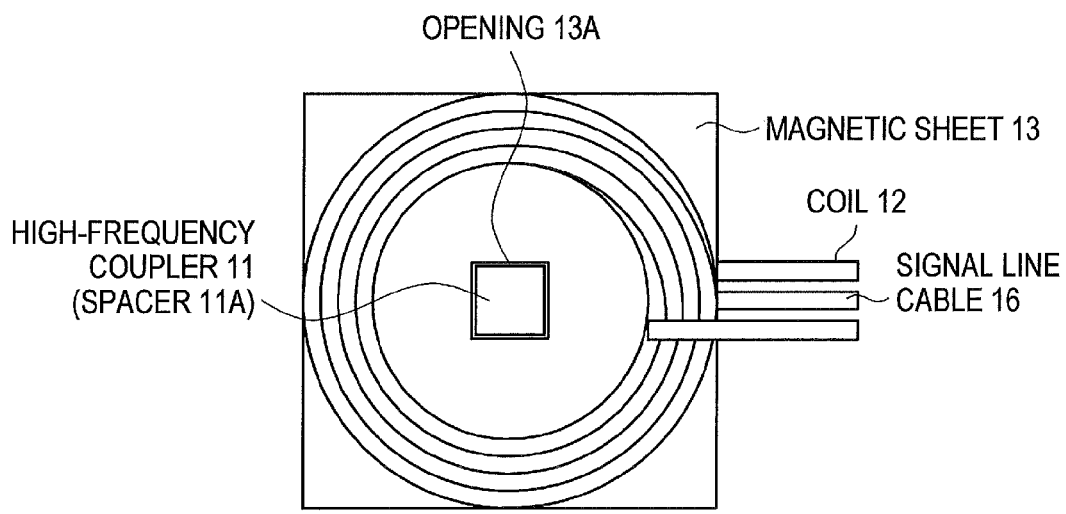
FIG. 7A is a diagram illustrating the configuration of a transmission and reception unit of a composite communication apparatus according to another embodiment of the present technology, when viewed from an upper surface.
Figure 7B:
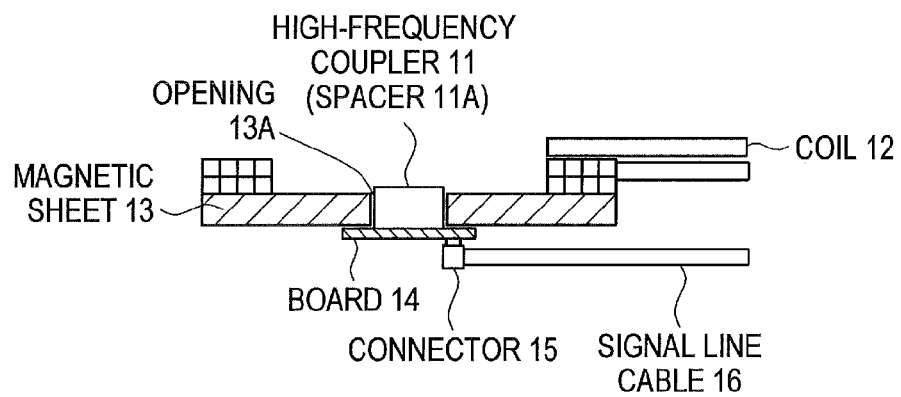
FIG. 7B is a diagram illustrating the cross-sectional configuration of the transmission and reception unit of the composite communication apparatus shown in FIG. 7A.

FIG. 7A is a diagram illustrating another configuration of the transmission and reception unit of the composite communication apparatus, when viewed from an upper surface. FIG. 7B is a diagram illustrating the cross-sectional configuration of the transmission and reception unit. This configuration is the same as the example of the configuration shown in FIGS. 1A and 1B in that the transmission and reception unit includes the high-frequency coupler 11, the non-contact power supply (power supply or power reception) coil 12, and the magnetic sheet 13, the high-frequency coupler 11 appears in the vicinity of the central portion of the coil 12, and the board 14 on which the high-frequency coupler 11 is mounted is covered with the magnetic sheet 13. Although not illustrated in the drawing, the metal such as the board of the apparatus is located below the magnetic sheet 13. The connector 15 configured to mount the signal line cable 16 on the high-frequency coupler 11 is disposed on the rear surface of the board 14 via a through hole (not shown).

In the example of the configuration shown in FIGS. 7A and 7B, the signal line cable 16 mounted on the connector 15 is connected to the communication circuit unit (not shown) without crossing the upper surface of the coil 12. That is, since the signal line cable 16 connected to the connector 15 is hidden below the magnetic sheet 13, the magnetic flux generated from the coil 12 at the time of the non-contact power supply does not reach the signal line cable 16 and no heat is generated due to the eddy current.

Figure 8A:
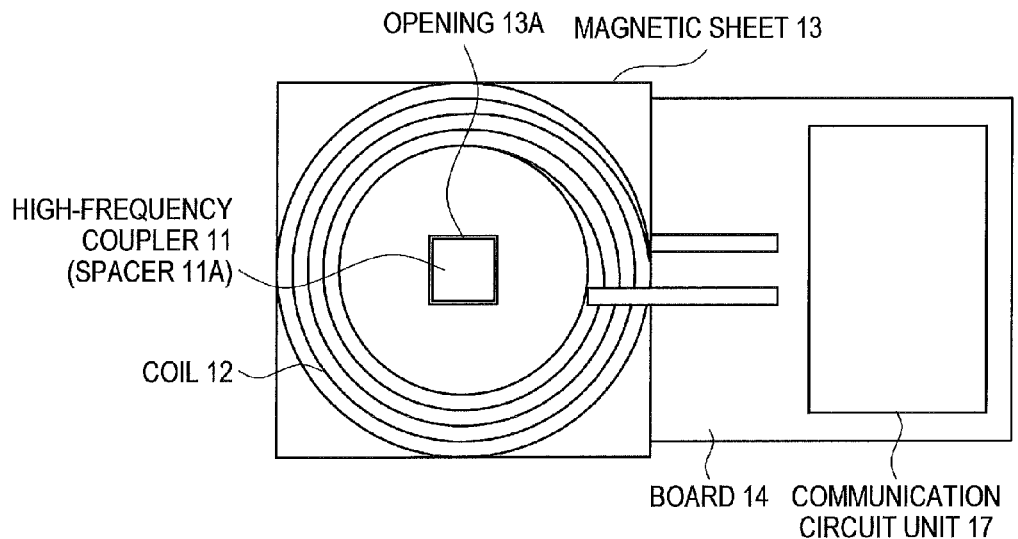
FIG. 8A is a diagram illustrating the configuration of a transmission and reception unit of a composite communication apparatus according to another embodiment of the present technology, when viewed from an upper surface.
Figure 8B:
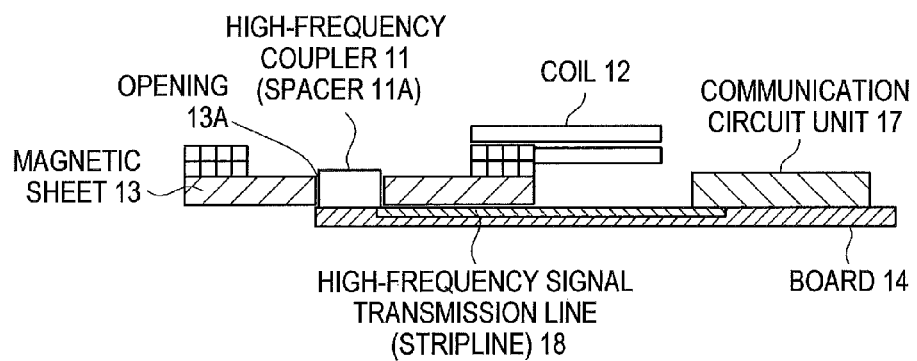
FIG. 8B is a diagram illustrating the cross-sectional configuration of the transmission and reception unit of the composite communication apparatus shown in FIG. 8A.
Figure 9A:
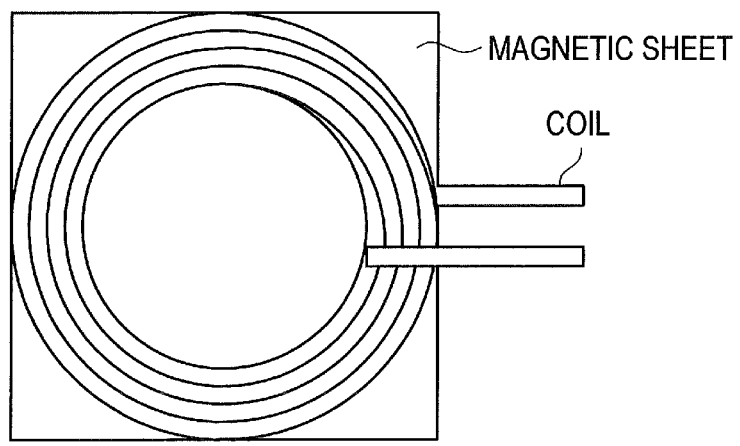
FIG. 9A is a diagram illustrating the configuration of a coil (for power supply or power reception) disposed on a magnetic sheet when viewed from an upper surface.
Figure 9B:
FIG. 9B is a diagram illustrating a cross-sectional configuration of a non-contact power supply unit shown in FIG. 9A.

FIG. 8A is a diagram illustrating another configuration of the transmission and reception unit of the composite communication apparatus, when viewed from an upper surface. FIG. 8B is a diagram illustrating the cross-sectional configuration of the transmission and reception unit. This configuration is the same as the example of the configuration shown in FIGS. 1A and 1B in that the transmission and reception unit includes the high-frequency coupler 11, the non-contact power supply (power supply or power reception) coil 12, and the magnetic sheet 13, the high-frequency coupler 11 appears in the vicinity of the central portion of the coil 12, and the board 14 on which the high-frequency coupler 11 is mounted is covered with the magnetic sheet 13. Although not illustrated in the drawing, the metal such as the board of the apparatus is located below the magnetic sheet 13.

In the example of the configuration shown in FIGS. 8A and 8B, a communication circuit unit 17 is mounted on the board 14 together with the high-frequency coupler 11. However, the high-frequency coupler 11 is disposed in the vicinity of the central portion of the coil 12, and the communication circuit unit 17 is disposed outside the coil 12. The high-frequency coupler 11 and the communication circuit unit 17 are connected to each other via a high-frequency transmission line formed of a stripline formed in a layer inside the board 14.

Since the high-frequency signal transmission line formed of the stripline is hidden below the magnetic sheet 13, the magnetic flux generated from the coil 12 at the time of the non-contact power supply does not reach the signal line cable 16, and no heat is generated due to the eddy current. The connector 15 shown in the examples of the configurations shown in FIGS. 6A, 6B, 7A, and 7B is not necessary in the configuration in which the high-frequency coupler 11 and the communication circuit 17 are connected to each other by the high-frequency transmission line 18 formed of the stripline. That is, since the connector 15 and the signal line cable 16 are substituted with the high-frequency transmission line 18 formed of a stripline, space can be saved.

Further, as the high-frequency signal transmission line 18 connecting the high-frequency coupler 11 to the communication circuit 17, a micro-stripline (not shown) formed on the surface of the board 14 may be used instead of the stripline formed in the layer in the board 14 in the configuration shown in FIGS. 8A and 8B.

Additionally, the present technology may also be configured as below.

(1) A communication apparatus including:
a magnetic sheet that includes an opening;
a non-contract power supply coil that is disposed on the magnetic sheet;
a high-frequency coupler that includes a coupling electrode, a ground, and a resonance unit configured to increase an amount of current flowing into the coupling electrode, and is configured such that the coupling electrode appears on the magnetic sheet via the opening; and
a communication circuit unit that processes a high-frequency signal transmitted to and received from the coupling electrode.

(2) The communication apparatus according to (1),
wherein a minute dipole configured by a line segment connecting a center of charge accumulated in the coupling electrode and a center of image charge accumulated in the ground is formed, and the high-frequency signal is transferred to a communication partner disposed to face the communication apparatus so that an angle θ formed between the communication partner and a direction of the minute dipole is approximately 0 degrees.

(3) The communication apparatus according to (1) or (2),
wherein the magnetic sheet includes the opening in a vicinity of a central portion of the non-contact power supply coil,
wherein the coupling electrode is disposed inside the non-contact power supply coil and appears on the magnetic sheet via the opening, and
wherein the ground and the resonance unit are hidden below the magnetic sheet.

(4) The communication apparatus according to (1) or (2),
wherein the high-frequency coupler includes a board, the ground formed in a conductor pattern on the board, the coupling electrode held on the board from the ground at a predetermined height, and the resonance unit disposed on the board,
wherein the magnetic sheet includes the opening in a vicinity of a central portion of the non-contact power supply coil,
wherein the coupling electrode is disposed inside the non-contact power supply coil and appears on the magnetic sheet via the opening, and
wherein the board including the ground and the resonance unit is hidden below the magnetic sheet.

(5) The communication apparatus according to any one of (1) to (4),
wherein the coupling electrode is formed of a conductor that has a strip shape so as to be reduced in volume.

(6) The communication apparatus according to (3) or (4), further including:
a connector configured to mount a signal line cable connecting the coupling electrode to the communication circuit unit.

(7) The communication apparatus according to (6), wherein the connector is disposed inside the non-contact power supply coil and appears together with the coupling electrode on the magnetic sheet via the opening, and wherein the signal line cable mounted on the connecter crosses an upper surface of the non-contact power supply coil to be connected to the communication circuit unit.

(8) The communication apparatus according to (6), wherein the connector is disposed outside the non-contact power supply coil, and wherein the signal line cable mounted on the connecter is connected to the communication circuit unit without crossing an upper surface of the non-contact power supply coil.

(9) The communication apparatus according to (6), wherein the connector is disposed below the magnetic sheet, and wherein the signal line cable mounted on the connecter is connected to the communication circuit unit without crossing an upper surface of the non-contact power supply coil.

(10) The communication apparatus according to (4), wherein the communication circuit unit is mounted on the board and is connected to the coupling electrode via a signal transmission line formed of a stripline formed in a layer inside the board.

(11) The communication apparatus according to (4), wherein the communication circuit unit is mounted on the board and is connected to the coupling electrode via a signal transmission line formed of a micro-stripline formed in a surface of the board.

(12) A communication system provided with a plurality of communication apparatuses each including:

a non-contact power supply coil;

a magnetic sheet that is disposed below the non-contact power supply coil and includes an opening in a vicinity of a central portion of the non-contact power supply coil; and a high-frequency coupler configured to include a coupling electrode, a ground, and a resonance unit, and configured such that the coupling electrode appears on the magnetic sheet via the opening.

It should be understood by those skilled in the art that various modifications, combinations, sub-combinations and alterations may occur depending on design requirements and other factors insofar as they are within the scope of the appended claims or the equivalents thereof.

The composite communication apparatus according to the embodiments of the present technology is applicable to various information apparatuses such as cradles of portable terminals or personal computers having a non-contact wireless transfer function.

In short, the embodiments of the present technology should not be construed as limiting to the described contents. The gist of the present technology should be determined based on the claims.

What is claimed is:

1. A communication apparatus comprising:

a magnetic sheet that includes an opening;

a non-contact power supply coil that is disposed on the magnetic sheet;

a high-frequency coupler that is mounted on a board, wherein the high-frequency coupler includes a coupling electrode, a ground, and a resonance unit configured to increase an amount of current flowing into the coupling electrode, and is configured such that the coupling electrode appears on the magnetic sheet via the opening, and wherein the magnetic sheet blocks magnetic flux generated from the non-contact power supply coil from reaching the board from the ground or the resonance unit of the high-frequency coupler;

a communication circuit unit that processes a high-frequency signal transmitted to and received from the coupling electrode; and a connector configured to mount a signal line cable connecting the coupling electrode to the communication circuit unit, wherein the connector is disposed inside the non-contact power supply coil and appears together with the coupling electrode on the magnetic sheet via the opening, and wherein the signal line cable mounted on the connecter crosses an upper surface of the non-contact power supply coil to be connected to the communication circuit unit.

2. The communication apparatus according to claim 1, wherein a minute dipole configured by a line segment connecting a center of charge accumulated in the coupling electrode and a center of image charge accumulated in the ground is formed, and the high-frequency signal is transferred to a communication partner disposed to face the communication apparatus so that an angle 8 formed between the communication partner and a direction of the minute dipole is approximately 0 degrees.

3. The communication apparatus according to claim 1, wherein the magnetic sheet includes the opening in a vicinity of a central portion of the non-contact power supply coil, wherein the coupling electrode is disposed inside the non-contact power supply coil and appears on the magnetic sheet via the opening, and wherein the ground and the resonance unit are hidden below the magnetic sheet.

4. The communication apparatus according to claim 1, wherein the ground is formed in a conductor pattern on the board, the coupling electrode is held on the board from the ground at a predetermined height, and the resonance unit is disposed on the board, wherein the magnetic sheet includes the opening in a vicinity of a central portion of the non-contact power supply coil, wherein the coupling electrode is disposed inside the non-contact power supply coil and appears on the magnetic sheet via the opening, and wherein the board including the ground and the resonance unit is hidden below the magnetic sheet.

5. The communication apparatus according to claim 1, wherein the coupling electrode is formed of a conductor that has a strip shape so as to be reduced in volume.

6. The communication apparatus according to claim 1, wherein the communication circuit unit is mounted on the board and is connected to the coupling electrode via a signal transmission line formed of a stripline formed in a layer inside the board.

7. The communication apparatus according to claim 1, wherein the communication circuit unit is mounted on the board and is connected to the coupling electrode via a signal transmission line formed of a micro-stripline formed in a surface of the board.

8. A communication apparatus comprising:

a magnetic sheet that includes an opening;

a non-contact power supply coil that is disposed on the magnetic sheet;

a high-frequency coupler that is mounted on a board, wherein the high-frequency coupler includes a coupling electrode, a ground, and a resonance unit configured to increase an amount of current flowing into the coupling electrode, and is configured such that the coupling electrode appears on the magnetic sheet via the opening, and wherein the magnetic sheet blocks magnetic flux generated from the non-contact power supply coil from reaching the board from the ground or the resonance unit of the high-frequency coupler;

a communication circuit unit that processes a high-frequency signal transmitted to and received from the coupling electrode; and a connector configured to mount a signal line cable connecting the coupling electrode to the communication circuit unit, wherein the connector is disposed below the magnetic sheet, and wherein the signal line cable mounted on the connecter is connected to the communication circuit unit without crossing an upper surface of the non-contact power supply coil.

9. A communication system provided with a plurality of communication apparatuses each comprising:

a non-contact power supply coil;

a magnetic sheet that is disposed below the non-contact power supply coil and includes an opening in a vicinity of a central portion of the non-contact power supply coil;

a high-frequency coupler that is mounted on a board, wherein the high-frequency coupler is configured to include a coupling electrode, a ground, and a resonance unit, and configured such that the coupling electrode appears on the magnetic sheet via the opening, and wherein the magnetic sheet blocks magnetic flux generated from the non-contact power supply coil from reaching the board from the ground or the resonance unit of the high-frequency coupler;

a communication circuit unit that processes a high-frequency signal transmitted to and received from the coupling electrode; and a connector configured to mount a signal line cable connecting the coupling electrode to the communication circuit unit, wherein the connector is disposed below the magnetic sheet, and wherein the signal line cable mounted on the connecter is connected to the communication circuit unit without crossing an upper surface of the non-contact power supply coil.

* * * * *